(12) United States Patent
Kang et al.

(10) Patent No.: US 6,211,979 B1
(45) Date of Patent: Apr. 3, 2001

(54) OPTICAL SWITCHING DEVICE HAVING RECIRCULATING STRUCTURE AND OPTICAL SWITCHING METHOD THEREFOR

(75) Inventors: Woo-Shik Kang, Suwon; Er-Ping Zhang, Seoul, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/078,666

(22) Filed: May 14, 1998

(30) Foreign Application Priority Data

May 27, 1997 (KR) .................................................. 97-20931

(51) Int. Cl.[7] .................................................. H04J 14/00
(52) U.S. Cl. .......................... 359/117; 359/128; 359/139; 359/165
(58) Field of Search .................................. 359/117, 128, 359/139, 165; 370/351, 386, 388, 389, 411, 360, 361; 365/77; 707/7

(56) References Cited

U.S. PATENT DOCUMENTS

| | | |
|---|---|---|
| 4,856,862 | 8/1989 | Passmore et al. . |
| 4,893,304 | 1/1990 | Giacopelli et al. . |
| 5,023,864 | 6/1991 | Cloonan et al. . |
| 5,077,483 | 12/1991 | Cloonan et al. . |
| 5,122,892 | 6/1992 | Cloonan et al. . |
| 5,258,978 | 11/1993 | Cloonan et al. . |
| 5,287,346 | 2/1994 | Bianchini, Jr. et al. . |
| 5,319,788 | 6/1994 | Canfield et al. . |
| 5,402,256 | 3/1995 | Spanke . |
| 5,416,769 | 5/1995 | Karol . |
| 5,440,549 | 8/1995 | Min et al. . |
| 5,469,284 | 11/1995 | Haas . |
| 5,526,352 | 6/1996 | Min et al. . |
| 5,546,393 | 8/1996 | Minc . |
| 5,546,484 | 8/1996 | Fling et al. . |
| 5,604,617 | 2/1997 | Burton . |
| 5,666,360 | * 9/1997 | Chen et al. .......................... 370/390 |

* cited by examiner

Primary Examiner—Jason Chan
Assistant Examiner—Christina Y Leung
(74) Attorney, Agent, or Firm—Robert E. Bushnell, Esq.

(57) ABSTRACT

An optical switching network has: N input couplers each having a cell input port and a recursive input port, N output couplers each having a cell output port and a recursive output port, N/2 switch couplers connected between the input couplers and the output couplers, and a controller having a routing table, for generating control signals for the respective input, output, and switch couplers upon input of cells. The optical switching network has a single-stage optical recursive loop in which an x-numbered recursive output port is connected to a 2x-numbered recursive input port if $0 \leq x < N/2$, and the x-numbered recursive output port is connected to a (2x−N+1)-numbered recursive input port if $N/2 \leq x < N$. The N input couplers receive the cells via the cell input ports upon input of the cells, the N/2 switch couplers recursively switch the cells $\log_2$ N-times by connecting the recursive output ports to the corresponding recursive input ports during circulations, and the N output couplers output the cells via the cell output ports at the termination of switching.

4 Claims, 14 Drawing Sheets exchange(Input)

bypass(Circulation)

exchange (Cell Exchange)

bypass ( Cell Bypass)

exchange (Circulation)

bypass (Output)

OPTICAL SWITCHING DEVICE HAVING RECIRCULATING STRUCTURE AND OPTICAL SWITCHING METHOD THEREFOR

CLAIM OF PRIORITY

This application makes reference to, incorporates the same herein, and claims all benefits accruing under 35 U.S.C. §119 from an application for OPTICAL SWITCHING DEVICE HAVING RECIRCULATING STRUCTURE AND OPTICAL SWITCHING METHOD THEREFOR earlier filed in the Korean Industrial Property Office on May 27, 1997 and there duly assigned Serial No. 20931/1997.

BACKGROUND OF THE INVENTION

1. Field of the Invention

The present invention relates to an optical switching device and an optical switching method therefor, and in particular, to a single-stage optical switching device having a recirculating structure and an optical switching method therefor.

2. Description of the Related Art

In general, many kinds of multiple interconnection networks (MINs) have been used in telephone switching systems for the past forty years, including Clos, Benes, Omega, Baynan, Baseline, Flip, and etc.. Research has been conducted on other kinds of networks for use in broadband switching systems or parallel computing systems.

The Omega network, obtained by cascading shuffle/exchange networks in $\log_2 N$ (N is both the number of input ports and the number of output ports) stages, is very important since it facilitates integration due to its symmetrical structure and thus can be used as a switching device in a broadband switching system or a parallel computing system requiring large switching capability. Therefore, the Omega network is suitable for modern technologies, especially, OEICs (i.e., optoelectrical integrated circuits) and PICs (i.e., photonic integrated circuits).

The non-blocking Omega network can increase its switching capability by increasing the number N of switch stages, and additionally have a batcher sorting network, a comparison/blocking circuit network, and a concentration circuit, for sorting and self-routing. However, such a conventional optical switching network shows limitations in realizing a large switching network system since it increases its switching capability by increasing the number of switch stages, resulting in a too bulky switch.

The following patents each disclose features in common with the present invention but do not teach or suggest an optical switching device having a recirculating structure and optical switching method therefor in accordance with the present invention: U.S. Pat. No. 5,526,352 to Min et al., entitled Integrated Low Complexity Broadband Multi-Channel Switch, U.S. Pat. No. 5,287,346 to Bianchini Jr. et al., entitled Packet Switch, U.S. Pat. No. 5,440,549 to Min et al., entitled Broadband Multi-Channel Switch With Multicasting Capability, U.S. Pat. No. 4,893,304 to Giacopelli et al., entitled Broadband Packet Switch With Combined Queuing, U.S. Pat. No. 5,546,484 to Fling et al., entitled Fiber Optic Switch Using Polished-Type Directional Coupler, U.S. Pat. No. 5,604,617 to Burton, entitled Telecommunications Switching Element, U.S. Pat. No. 5,402,256 to Spanke, entitled Optical Time Slot Interchanger Apparatus And Method Of Operation, U.S. Pat. No. 5,416,769 to Karol, entitled Controlled-Feedback Packet Switching System, U.S. Pat. No. 4,856,862 to Passmore et al., entitled Optical Storage Method And Apparatus, U.S. Pat. No. 5,258,978 to Cloonan et al., entitled Space-Division Switching Network Having Reduced Functionality Nodes, U.S. Pat. No. 5,122,892 to Cloonan et al. entitled Space-Division Switching Network Having Reduced Functionality Nodes, U.S. Pat. No. 5,077,483 to Cloonan et al., entitled Network Topology For Reduced Blocking And Photonic System Implementation Thereof U.S. Pat. No. 5,023,864 to Cloonan et al., entitled Crossover Network Utilizing Two-Dimensional Arrays Of Nodes, U.S. Pat. No. 5,546,393 to Minc, entitled Asynchronous Transfer Mode Data Cell Routing Device For A Reverse Omega Network, U.S. Pat. No. 5,319,788 to Canfield et al., entitled Modified Batcher Network For Sorting N Unsorted Input Signals In $\log_2 N$ Sequential Passes, and U.S. Pat. No. 5,469,284 to Haas, entitled Optical Packet Switch.

SUMMARY OF THE INVENTION

An object of the present invention is to provide an optical switching network having a recirculating structure and an optical switching method therefor, for use in broadband service.

Another object of the present invention is to provide a single-stage optical switching network and an optical switching method therefor, for shuffling input cells through $\log_2 N$ circulations and switching the input cells according to corresponding address bits during the circulations.

To achieve the above objects, there is provided an optical switching network having N input couplers each having a cell input port and a recursive input port, N output couplers each having a cell output port and a recursive output port, N/2 switch couplers connected between the input couplers and the output couplers, and a controller having a routing table, for generating control signals for the respective input, output, and switch couplers upon input of cells. The optical switching network has a single-stage optical recursive loop in which an x-numbered recursive output port is connected to a 2x-numbered recursive input port if $0 \leq x < N/2$, and the x-numbered recursive output port is connected to a (2x−N+1)-numbered recursive input port if $N/2 \leq x < N$. The N input couplers receive the cells via the cell input ports upon input of the cells, the N/2 switch couplers recursively switch the cells $\log_2$ N-times by connecting the recursive output ports to the corresponding recursive input ports during circulations, and the N output couplers output the cells via the cell output ports at the termination of switching.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
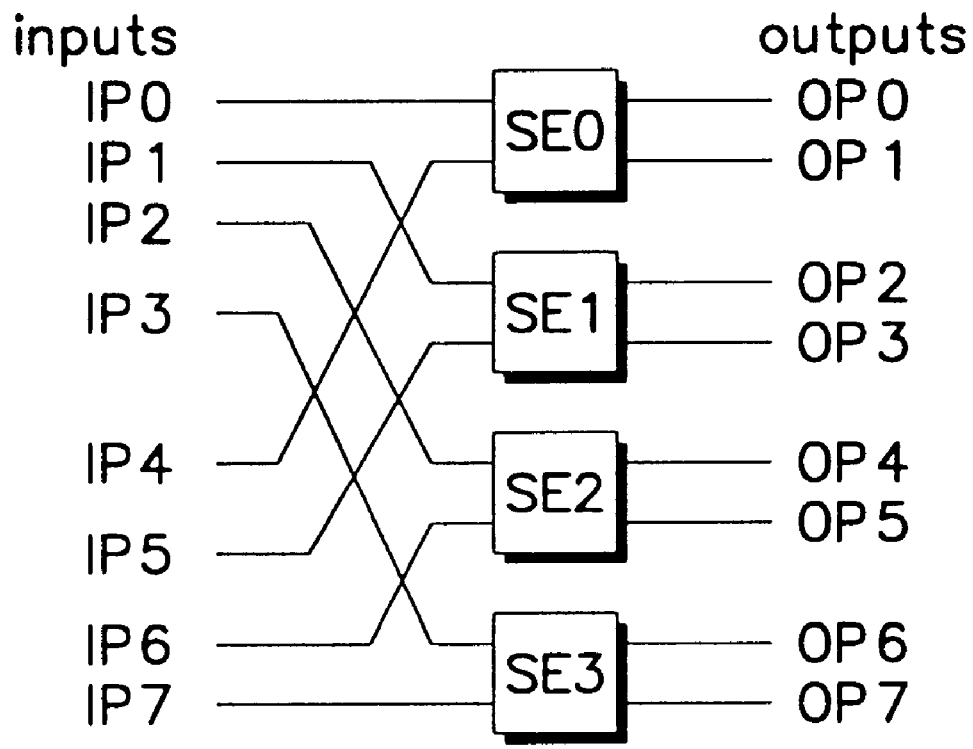
FIG. 1 schematically illustrates a shuffle/exchange network with N of 8.
Figure 2A:
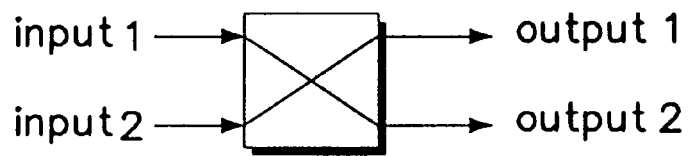
FIGS. 2A and 2B respectively illustrate exchange and bypass of cells in a 2×2 switch element.
Figure 2B:
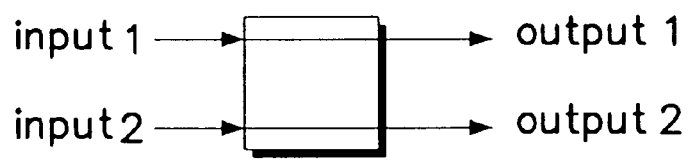

FIG. 1 schematically illustrates a shuffle/exchange network with N of 8. Here, N indicates both the number of input ports and the number of output ports. In FIG. 1, switch elements SE0–SE3 are 2×2 switches. FIGS. 2A and 2B illustrate exchange and bypass states of input cells in a 2×2 switch element respectively.

Referring to FIG. 1, cells are shuffled and received in the four switch elements SE0–SE3 via input ports I0–I7. Then, the switch elements SE0–SE3 are set to an exchange or bypass state by a control signal (not shown) and outputs their received cells, as shown in FIGS. 2A and 2B. This implies that the cells are supplied to the switch elements SE0–SE3 via the input ports I0–I7 by shuffle, and the switch elements SE0–SE3 are controlled to switch-output the shuffled cells. Shuffle/exchange of an 8×8 switch can be completed in the above manner.

For an Omega network with N input signals and N output signals, shuffle/exchange networks should be cascaded in $\log_2 N$ stages and each stage has N/2 2×2 switch elements, to realize non-blocking due to its self-routing properties.

Figure 3:
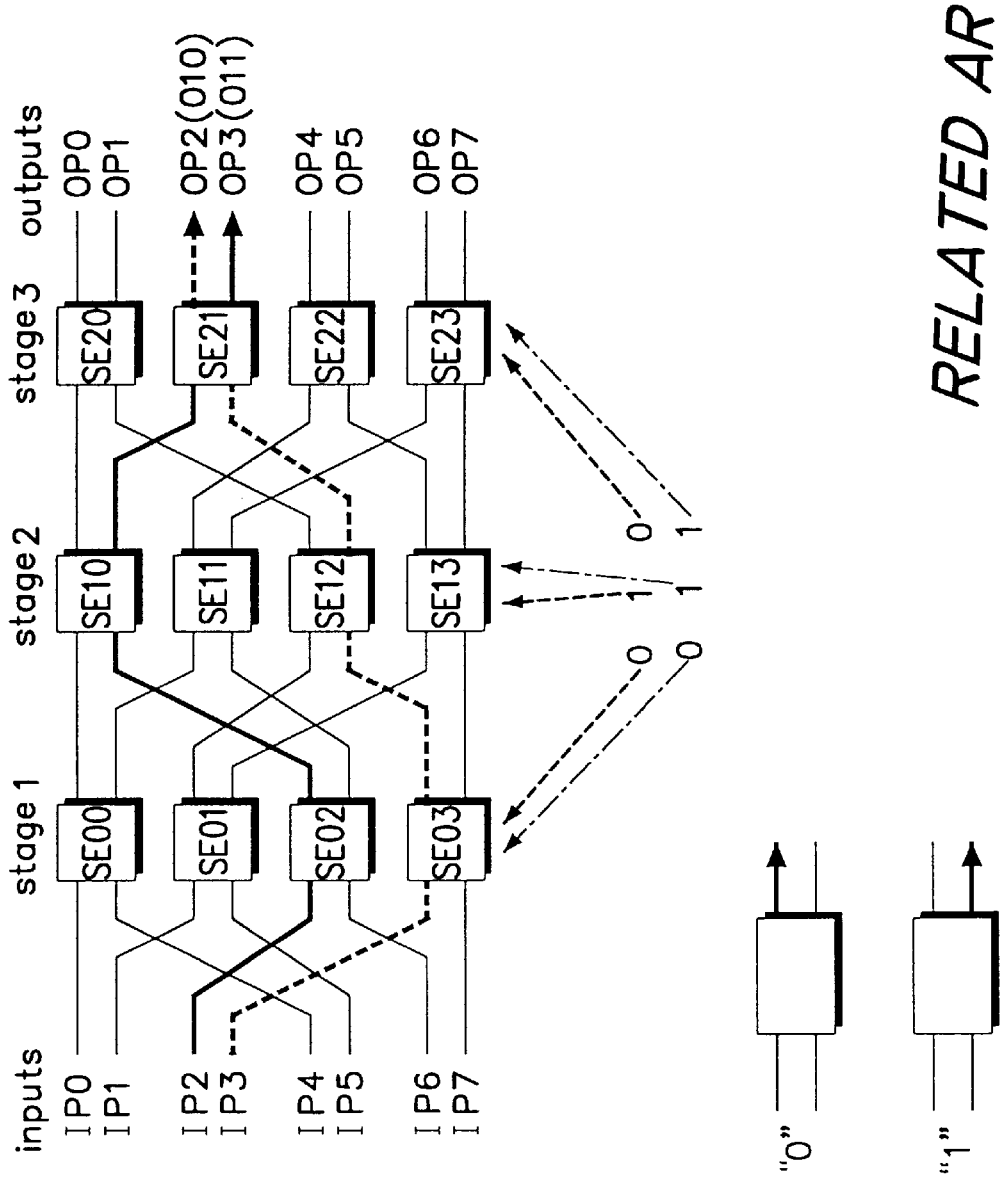
FIG. 3 schematically illustrates an earlier non-blocking self-routing Omega network.

FIG. 3 schematically illustrates a three-stage non-blocking self-routing Omega network. In FIG. 3, the switching network has four 2×2 switch elements SE00–SE03, SE10–SE13, or SE20–SE23 in each stage, and the respective switch elements SE00–SE03, SE10–SE13, and SE20–SE23 are set to two states: exchange and bypass, so that they exchange or bypass input cells according to address bits of cell headers, that is, they select output ports according to the address bits of the cell headers. In other words, the switch elements SE00–SE03 in the first stage determine whether to exchange or bypass input cells according to the first address bits of their cell headers, the switch elements SE10–SE13 in the second stage determine whether to exchange or bypass the input cells according to the second address bits of the cell headers, and the switch elements SW20–SW23 determine whether to exchange or bypass the input cells according to the third address bits of the cell headers.

Such exchange and bypass of the input cells in the switch elements SE00–SE03, SE10–SE13, and SE20–SE23 are controlled by an electronic control unit (ECU). A bold line and a one-dot line in FIG. 3 respectively indicate self-routing paths of cells from input ports I2 and I3 to output ports O2 and O3 through switching. After passing through the three stages in the above switching network, all the input cells reach their corresponding destinations without any blocking. A description of the output ports has been omitted.

Figure 4:
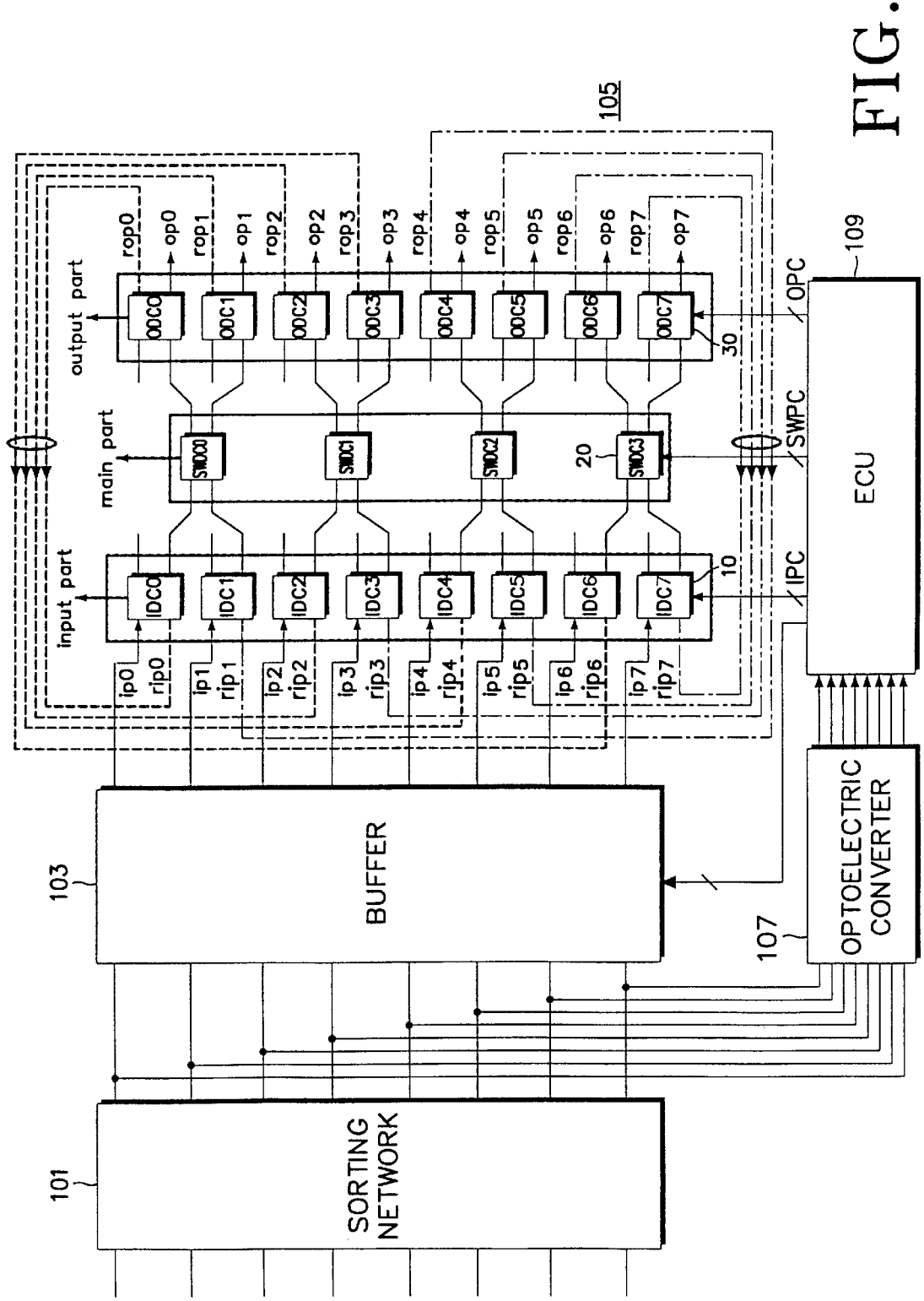
FIG. 4 schematically illustrates an 8×8 Omega network according to an embodiment of the present invention.

FIG. 4 schematically illustrates a single-stage Omega network with a recirculating structure having N of 8 as an optical switching network according to an embodiment of the present invention.

Referring to FIG. 4, a sorting network 101 sorts all cells according to their output port numbers, and outputs the sorted cells to an optoelectric converter 107 and a buffer 103. The optoelectric converter 107 converts the received optical cells to electrical packets, and sends these signals to an ECU 109. The buffer 103 buffers the received cells while the ECU 109 analyzes cell headers.

A switching network 105 has a single-stage recirculating structure, and has an input part 10 including cell input ports ip0–ip7 and recursive input ports rip0–rip7, an output part 30 including cell output ports op0–op7 and recursive output ports rop0–rop7, a main part 20 interposed between the input part 10 and the output part 30, for exchanging or bypassing cells. The main part 20, serving to switch cells, will be called the switch part 20 hereinafter.

After analyzing the cell headers, the ECU 109 simultaneously determines paths for all the input cells and the states of respective switch elements. It supplies all the cells stored in the buffer 103 to the input ports ip0–ip7 by controlling the buffer 103. Then, the ECU 109 initiates circulations by controlling the input part 10 and the output part 30 to select the recursive input ports rip0–rip7 and the recursive output ports rop0–rop7, and performs cell switching by controlling the switch part 20 to repeatedly exchange or bypass input cells according to address bits of the cell headers. When three circulations are completed in the above manner, the ECU 109 selects output ports op0–op7 of the output port 30 and outputs the completely switched cells.

The input part 10 of the switching network 105 is comprised of eight input couplers IDC0–IDC7 which respectively have cell input ports ip0–ip7 and recursive input ports rip0–rip7, for switch-outputting signals by means of an input control signal IPC. The input ports ip0–ip7 of the input couplers IDC0–IDC7 are used for receiving cells from the buffer 103, and the recursive input ports rip0–rip7 are used for receiving recursive cells from the recursive output ports rop0–rop7 of the output part 20. Each of the input couplers IDC0–IDC7 is directional and has two input ports and one output port.

An input-output relationship of the recursive input ports rip0–rip7 in the input part 10 is made as follows.

TABLE 1

| input | output | |
|---|---|---|
| rip0 | rop0 | first input port of SWDC0 |
| rip1 | rop4 | second input port of SWDC0 |
| rip2 | rop1 | first input port of SWDC1 |
| rip3 | rop5 | second input port of SWDC1 |
| rip4 | rop2 | first input port of SWDC2 |
| rip5 | rop6 | second input port of SWDC2 |
| rip6 | rop3 | first input port of SWDC3 |
| rip7 | rop7 | second input port of SWDC3 |

The switch part 20 is comprised of four switch couplers SWDC0–SWDC3. Each of the switch couplers SWDC0–SWDC3 is directional and has two input ports and two output ports, for exchanging or bypassing cells received from the input part 10 by a switch control signal SWPC and supplying the exchanged or bypassed cells to the output part 30. The first inputs and outputs of the switch couplers SWDC0–SWDC3 can be called upper inputs and outputs, and the second inputs and outputs thereof can be called lower inputs and outputs.

An input-output relationship of the switch couplers SWDC0–SWDC3 is shown in the following table.

TABLE 2

| input | switch | output |
| --- | --- | --- |
| output of IDC0 | exchange or bypass in SWDC0 | input of ODC0 |
| output of IDC1 | exchange or bypass in SWDC0 | input of ODC1 |
| output of IDC2 | exchange or bypass in SWDC1 | input of ODC2 |
| output of IDC3 | exchange or bypass in SWDC1 | input of ODC3 |
| output of IDC4 | exchange or bypass in SWDC2 | input of ODC4 |
| output of IDC5 | exchange or bypass in SWDC2 | input of ODC5 |
| output of IDC6 | exchange or bypass in SWDC3 | input of ODC6 |
| output of IDC7 | exchange or bypass in SWDC3 | input of ODC7 |

The output part 30 is comprised of eight output couplers ODC0–ODC7 which have cell output ports op0–op7 and recursive output ports rop0–rop7, respectively, and switch-outputs cells received from the switch couplers SWDC0–SWDC3 to the output ports op0–op7 and the recursive output ports rop0–rop7 by means of an output control signal OPC. The output ports op0–op7 of the output couplers OPC0–OPC7 serve to output completely switched cells, whereas the recursive output ports rop0–rop7 thereof serve to feed back cells output during switching to the recursive input ports rip0–rip7. Each of the output couplers ODC0–ODC7 is directional and has one input port and two output ports.

Here, optic fibers connect the recursive output ports rop0–rop7 of the output part 30 to the recursive input ports rip0–rip7 of the input part, thus forming a recursive loop for shuffling cells in the single-stage Omega network.

The interconnection between the recursive output ports rop0–rop7 and the recursive input ports rip0–rip7 is made as in table 3, in the Omega network with N of 8.

TABLE 3

| input | | output |
| --- | --- | --- |
| rop0 | first output port of SWDC0 | rip0 |
| rop1 | second output port of SWDC0 | rip1 |
| rop2 | first output port of SWDC1 | rip2 |
| rop3 | second output port of SWDC1 | rip3 |
| rop4 | first output port of SWDC2 | rip4 |
| rop5 | second output port of SWDC2 | rip5 |
| rop6 | first output port of SWDC3 | rip6 |
| rop7 | second output port of SWDC3 | rip7 |

The ECU 109 generates the input control signal IPC for selecting inputs of the input part 10, the switch control signal SWPC for controlling cell switching in the switch part 20, and the output control signal OPC for selecting outputs of the output part 30.

The input control signal IPC controls cells output from the buffer 103 to be applied to the input ports ip0–ip7 of the input port 10 in the beginning, and cells output from the recursive output ports rop0–rop7 of the output part 30 to be fed back to the recursive input ports rip0–rip7 during circulations. Therefore, the input control signal IPC is an input/recirculating signal.

The switch control signal SWPC controls cells received in the switch couplers SWDC0–SWDC3 of the switch part 20 to be switched. Thus, the switch control signal SWPC is a bypass/exchange signal for bypassing or exchanging the cells output from the input part 10.

The output control signal OPC controls the cells bypassed or exchanged in the switch part to be output to the recursive output ports rop0–rop7 during the circulations, and cells received from the switch part 20 to be selectively output to the output ports op0–op7 at the end. Therefore, the output control signal OPC is an output/recirculating signal.

The input couplers IDC0–IDC7 of the input part 10, the switch couplers SWDC0–SWDC3, and the output couplers ODC0–ODC7 of the output part 30 in the single-stage Omega network constituted as in FIG. 4 act as 2×2 switch elements. Electronic devices or optical devices, relying on the same principle, can be used as the switch elements. In the embodiment of the present invention, directional couplers being one of widely used optical devices serve as the switch elements.

Figure 5:
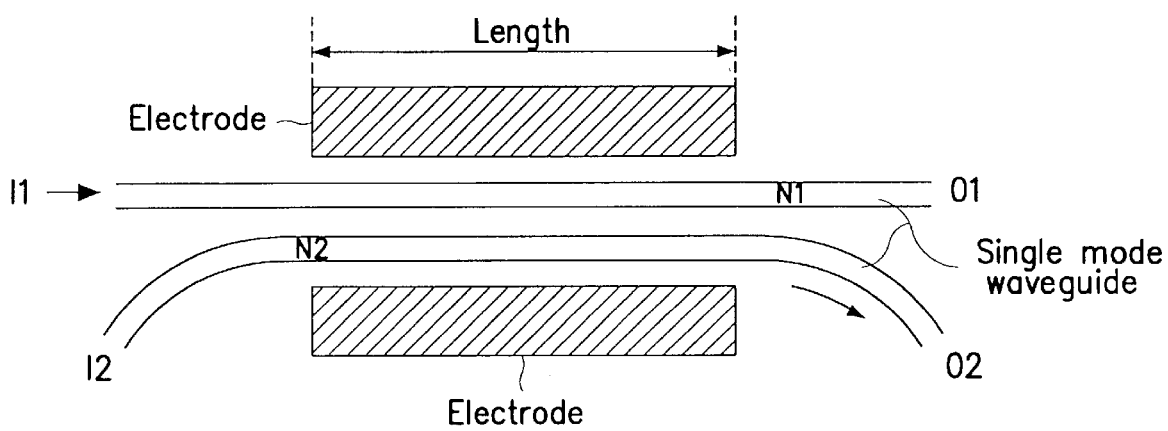
FIG. 5 schematically illustrates a directional coupler according to the embodiment of the present invention.

FIG. 5 illustrates the structure of a directional coupler serving as a switch element. Referring to FIG. 5, the directional coupler DC has two input ports i1 and i2, two output ports o1 and o2, and a single control port. A z-cut $LiNbo_3$ substrate is used for the directional coupler DC, and titanium diffused waveguides are used for the input and output ports. In the directional coupler DC, two optical waveguides are arranged adjacent to each other and chiefly formed of an electrooptical crystal such as $LiNO_3$.

Attenuation charges of both the waveguides are overlapped, which is termed coupling. The power of a light wave incident on a first waveguide N1 is entirely or partially coupled with that of a second waveguide N2. Coupling efficiency is related to the phase velocities of the two waveguides N1 and N2. Since both waveguides N1 and N2 have the same size and structure, their phase velocities are equal. At this time, the coupling efficiency is approximately 100%, and an input signal is exchanged. Then, the coupling efficiency rapidly drops, and reaches almost 0% since the phase velocities of the two waveguides N1 and N2 can be different by means of a voltage applied to an electrode. At this time, an input signal is bypassed.

Since the state, that is, exchange or bypass of the directional coupler DC can be altered by supplying a voltage to the electrode or not, the directional coupler DC can act as a 2×2 optical switch under electronic control. The directional coupler DC is set to an exchange state when V=0, that is, the control voltage is not supplied, whereas it is set to a bypass state when $V=V_0$, that is, the control voltage is supplied. Accordingly, the directional coupler DC can produce a high modulation efficiency and facilitate integration, based on electrooptical effects.

Figure 6A:
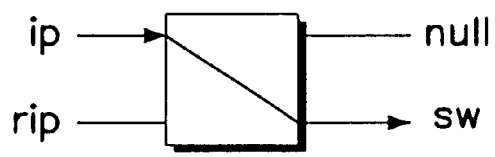
FIGS. 6A and 6B illustrate two states of the directional coupler shown in FIG. 5 in an input part, respectively in the beginning and during a circulation.
Figure 6B:
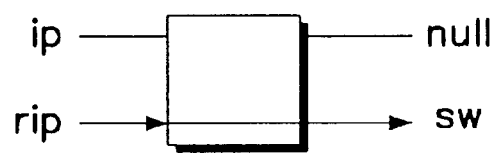

The input couplers IDC0–IDC7 of the input part 10 in the Omega network of FIG. 4 are 2×2 directional couplers as shown in FIG. 5. One of their respective two output ports is connected to a corresponding directional coupler of the switch part 20 in the next stage, and the other is nullified. As shown in FIGS. 6A and 6B, the input couplers IDC0–IDC7 perform two operations (i.e., exchange and bypass) by means of the input control signal IPC.

FIG. 6A illustrates selection (i.e. exchange) of an input cell supplied to an input port ip, which is performed in an input coupler under the control of the ECU 109 in the beginning. That is, when the ECU 109 generates the input control signal IPC for selecting an input cell in the beginning, the input couplers IDC0–IDC7 select cells received via the input ports ip0–ip7, respectively, as shown in FIG. 6A.

FIG. 6B illustrates selection (i.e., bypass) of a cell fed back to a corresponding recursive input port rip, which is performed in an input coupler under the control of the ECU 109 during a circulation. That is, when the ECU 109 generates the input control signal IPC for selecting a recursive cell during the circulation, the input couplers IDC0–IDC7 bypass recursive cells applied to the recursive input ports rip0–rip7, respectively, as shown in FIG. 6B.

The switch couplers SWDC0–SWDC3 of the switch part 20 in the Omega network of FIG. 4 are 2×2 directional couplers constituted as in FIG. 5. The two input ports of each switch coupler are connected to the output ports of their two corresponding input couplers, whereas the two output ports thereof are connected to the input ports of their two corresponding output couplers. As show in FIGS. 7A and 7B, the switch couplers SWDC0–SWDC3 perform two operations (i.e, exchange and bypass) by means of the switch control signal SWPC.

Figure 7A:
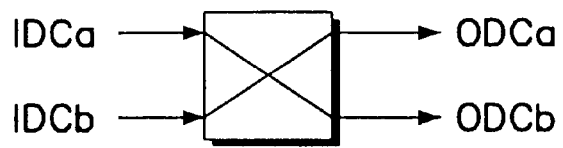
FIGS. 7A and 7B illustrate exchange and bypass of the directional coupler in a main part.

FIG. 7A illustrates exchange of input cells in the switch couplers SWDC0–SWDC3 under the control of the ECU 109 during a circulation. That is, when the ECU 109 generates the switch control signal SWPC for exchanging input cells, the switch couplers SWDC0–SWDC3 exchange the input cells, respectively, as shown in FIG. 7A.

Figure 7B:
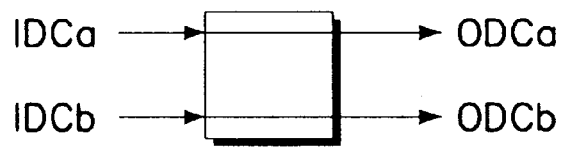

FIG. 7B illustrates bypass of input cells in the switch couplers SWDC0–SWDC3 under the control of the ECU 109 during the circulation. That is, when the ECU 109 generates the switch control signal SWPC for bypassing input cells, the switch couplers SWDC0–SWDC3 bypass the input cells, respectively, as shown in FIG. 7B.

Figure 8A:
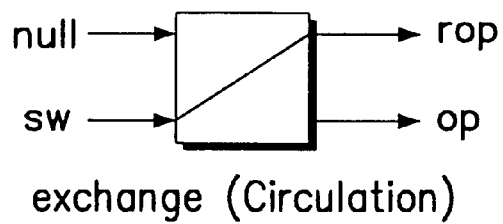
FIGS. 8A and 8B illustrate two states of the directional coupler in an output part in the beginning, during a circulation, and at the end.
Figure 8B:
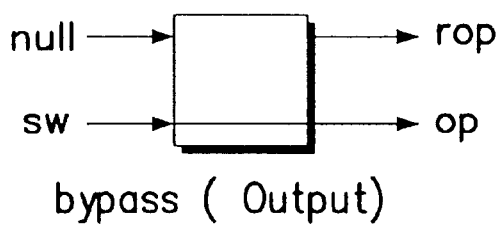

The output couplers ODC0–ODC7 of the output part 30 in the Omega network of FIG. 4 are 2×2 directional couplers constituted as in FIG. 5. One input port of each output coupler has is connected to a corresponding switch coupler in the previous stage, whereas the other input port thereof is nullified. One output port of the output coupler is connected to the recursive input port of a corresponding input coupler, whereas the other output port thereof outputs a completely switched cell at the end. As shown in FIGS. 8A and 8B, the output couplers ODC0–ODC7 perform two operations (i.e., exchange and bypass) by means of the output control signal OPC.

FIG. 8A illustrates selection of a cell applied to an input port of an output coupler and output of the selected cell to an recursive output port under the control of the ECU 109 during a circulation, which implies exchange of the cell. That is, when the ECU 109 generates the output control signal OPC for circulating input signals, the output couplers ODC0–ODC7 feed back cells to their corresponding input couplers IDC0–IDC7 via the recursive output ports rop0–rop7, respectively, as shown in FIG. 8A.

FIG. 8B illustrates output (i.e., bypass) of a completely switched signal from an output coupler to its output port under the control of the ECU 109 at the end. That is, when the ECU 109 generates the output control signal OPC for outputting completely switched signals at the end, the output couplers ODC0–ODC7 output the completely switched signals to the output ports op0–op7, respectively, as shown in FIG. 8B.

The ECU 109 in the single-stage Omega network controls input and output of a signal, referring to a control table as shown in table 4. In table 4, I0–I7 are input port numbers, O0–O7 are output port numbers, and 000–111 are address bits. Here, the address bits act as the switch control signal SWPC output from the ECU 109, the input port numbers I0–I7 correspond to the input couplers IDC0–IDC7 of the input part. 10, and the output port numbers O0–O7 correspond to the output couplers ODC0–ODC7 of the output part 30. As shown in table 4, the output couplers ODC0–ODC7 are determined according to the values of the address bits.

TABLE 4

|    | 000 | 001 | 010 | 011 | 100 | 101 | 110 | 111 |
|----|-----|-----|-----|-----|-----|-----|-----|-----|
| I0 | O0  | O1  | O2  | O3  | O4  | O5  | O6  | O7  |
| I1 | O0  | O1  | O2  | O3  | O4  | O5  | O6  | O7  |
| I2 | O0  | O1  | O2  | O3  | O4  | O5  | O6  | O7  |
| I3 | O0  | O1  | O2  | O3  | O4  | O5  | O6  | O7  |
| I4 | O0  | O1  | O2  | O3  | O4  | O5  | O6  | O7  |
| I5 | O0  | O1  | O2  | O3  | O4  | O5  | O6  | O7  |
| I6 | O0  | O1  | O2  | O3  | O4  | O5  | O6  | O7  |
| I7 | O0  | O1  | O2  | O3  | O4  | O5  | O6  | O7  |

Figure 9:
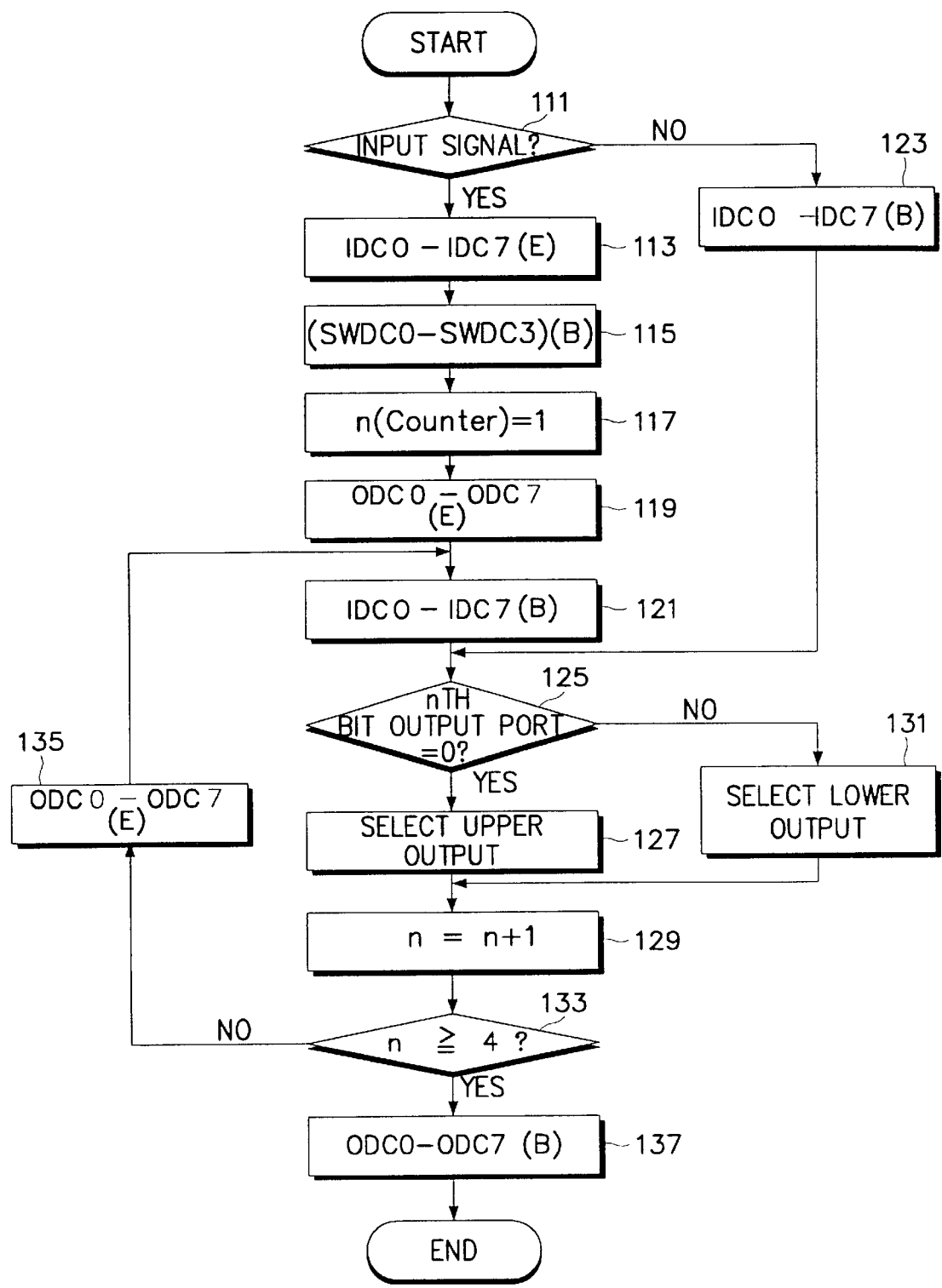
FIG. 9 is a flowchart of switching cells in the 8×8 Omega network shown in FIG. 4.

FIG. 9 is a flowchart of switching input cells in the 8×8 single-stage Omega network of FIG. 4.

Referring to table 4 and FIG. 9, the switching operation of the single-stage Omega network will be described. Upon input of cells, the ECU 109 separates headers from the cells, analyzes the headers, and determines output ports for the respective cells. Then, it simultaneously determines paths for the respective cells according to the input and output port numbers of the cells and a routing table, and the state of each switch element according to the number of circulations. Then, the ECU 109 controls the buffer 103 to output its stored cells to corresponding input ports ip0–ip7 of the input part 10.

In the case of an 8×8 switching network, the routing table is made as shown in table 5.

TABLE 5

|    | O0 | O1 | O2 | O3 | O4 | O5 | O6 | O7 |
|----|----|----|----|----|----|----|----|----|
| I0 | B(00) | B(00) | B(00) | B(00) | E(00) | E(00) | E(00) | E(00) |
|    | B(01) | B(01) | E(01) | E(01) | B(11) | B(11) | E(11) | E(11) |
|    | B(02) | E(02) | B(12) | E(02) | B(22) | E(22) | B(32) | E(32) |
| I1 | X | B(10) | B(10) | B(00) | E(10) | E(10) | E(10) | E(10) |
|    |   | B(21) | E(21) | E(21) | B(31) | B(31) | E(31) | E(31) |
|    |   | B(02) | E(12) | B(12) | E(22) | B(22) | E(32) | B(32) |
| I2 | X | X | B(20) | B(20) | E(20) | E(20) | E(20) | E(20) |
|    |   |   | B(01) | B(01) | E(11) | E(11) | B(11) | B(11) |
|    |   |   | B(12) | E(12) | B(22) | E(22) | B(32) | E(32) |
| I3 | X | X | X | B(30) | E(30) | E(30) | E(30) | E(30) |
|    |   |   |   | B(21) | E(31) | E(31) | E(31) | B(31) |
|    |   |   |   | B(12) | E(22) | E(22) | E(32) | B(32) |
| I4 | X | X | X | X | B(00) | B(00) | B(00) | B(00) |
|    |   |   |   |   | B(11) | B(11) | E(11) | E(11) |
|    |   |   |   |   | B(22) | E(22) | B(32) | E(32) |
| I5 | X | X | X | X | X | B(10) | B(10) | B(10) |
|    |   |   |   |   |   | B(31) | E(31) | E(31) |
|    |   |   |   |   |   | B(22) | E(32) | B(32) |
| I6 | X | X | X | X | X | X | B(20) | B(20) |
|    |   |   |   |   |   |   | B(11) | B(11) |
|    |   |   |   |   |   |   | B(32) | E(32) |
| I7 | X | X | X | X | X | X | X | B(30) |
|    |   |   |   |   |   |   |   | B(31) |
|    |   |   |   |   |   |   |   | B(32) |

The ECU 109 recognizes input of the cells to the input ports ip0–ip7 of the input part 10, in step 111. The ECU 109 generates the input control signal IPC for controlling the input couplers IDC0–IDC7 to select the input ports ip0–ip7 in step 113, and the switch control signal SWPC for controlling the switch couplers SWDC0–SWDC3 to bypass input cells in step 115. Then, the input couplers IDC0–IDC7 exchange the signals applied to their corresponding input ports op0–ip7 as shown in FIG. 6A, and output the exchanged signals to the input ports of their corresponding switch couplers SWDC0–SWDC3. The switch couplers SWDC0–SWDC3 of the switch part 20 bypass the input cells as shown in FIG. 7B.

Subsequently, the ECU 109 sets a circulation counter n for indicating the number of cell circulations to 1, in step 117. The ECU 109 generates the output control signal OPC for controlling the output couplers ODC0–ODC7 of the output part 30 to output input cells via the recursive output ports rop0–rop7 in step 119, and the input control signal IPC for controlling the input couplers IDC0–IDC7 of the input part to bypass the recursive cells. Thus, the output couplers ODC0–ODC7 of the output part 30 output the cells received from their corresponding switch couplers SWDC0–SWDC7 via the recursive output ports rop0–rop7, and the input couplers IDC0–IDC7 of the input part 10 recursively receive the cells from their corresponding recursive output ports rop0–rop7 via the recursive input ports rip0–rip7.

The ECU 109 checks the nth address bits of the cell headers in step 125, and generates a corresponding switch control signal SWPC in step 127 or 131. Here, the ECU 109 generates the switch control signal for bypassing an input signal in a switch coupler if the nth address bit of its cell header is "0", and for exchanging the input signal in the switch coupler if the nth address bit is "1". Then, the input cells are exchanged as shown in FIG. 7A, or bypassed as shown in FIG. 7B, by means of the switch control signal SWPC.

After controlling the switch part 20 to exchange or bypass the cells, the ECU 109 increments the circulation counter n by one, in step 129. This implies that the input cells are switched once. In step 133, the ECU 109 determines whether the value of the circulation counter n is 4. If the counted value is 4, this indicates that three cell switching operations are performed in the 8×8 switching network as shown in FIG. 4. If the counted value is smaller than 4, switching is yet to be performed. Thus, after the ECU 109 generates the output control signal OPC for keeping the output part 30 in the state as shown in FIG. 8A, the procedure goes back to step 121.

In the above manner, the ECU 109 controls switching of the input cells by sequentially analyzing the address bits of the cell headers so that the output part 30 and the input part 10 recursively output and receive switched cells. If cells are circulated and switched repeatedly until the value of the circulation counter n is 4, which implies that the cells are completely switched with respect to the three-bit addresses of the cell headers, the ECU 109 generates the output control signal OPC for controlling the output couplers ODC0–ODC7 of the output part 30 to output the completely switched cells to the output ports op0–op7, in step 137. Thus, the output couplers ODC0–ODC7 of the output part 30 finally output the switched cells as shown in FIG. 8B.

As described above, the recursive output ports rop0–rop7 of the output couplers ODC0–ODC7 are connected to the recursive input ports rip0–rip7 of their corresponding input couplers IDC0–IDC7, for perfect shuffle in the single-stage Omega network. In such an optical switching network having a recirculating structure, input cells are subjected to three circulations and then switch-output. Here, to perform the same switching operation as that of a general 8×8 switching network constituted in three stages, the number of circulations is set to 3 in the single-stage optical switching network.

Figure 10:
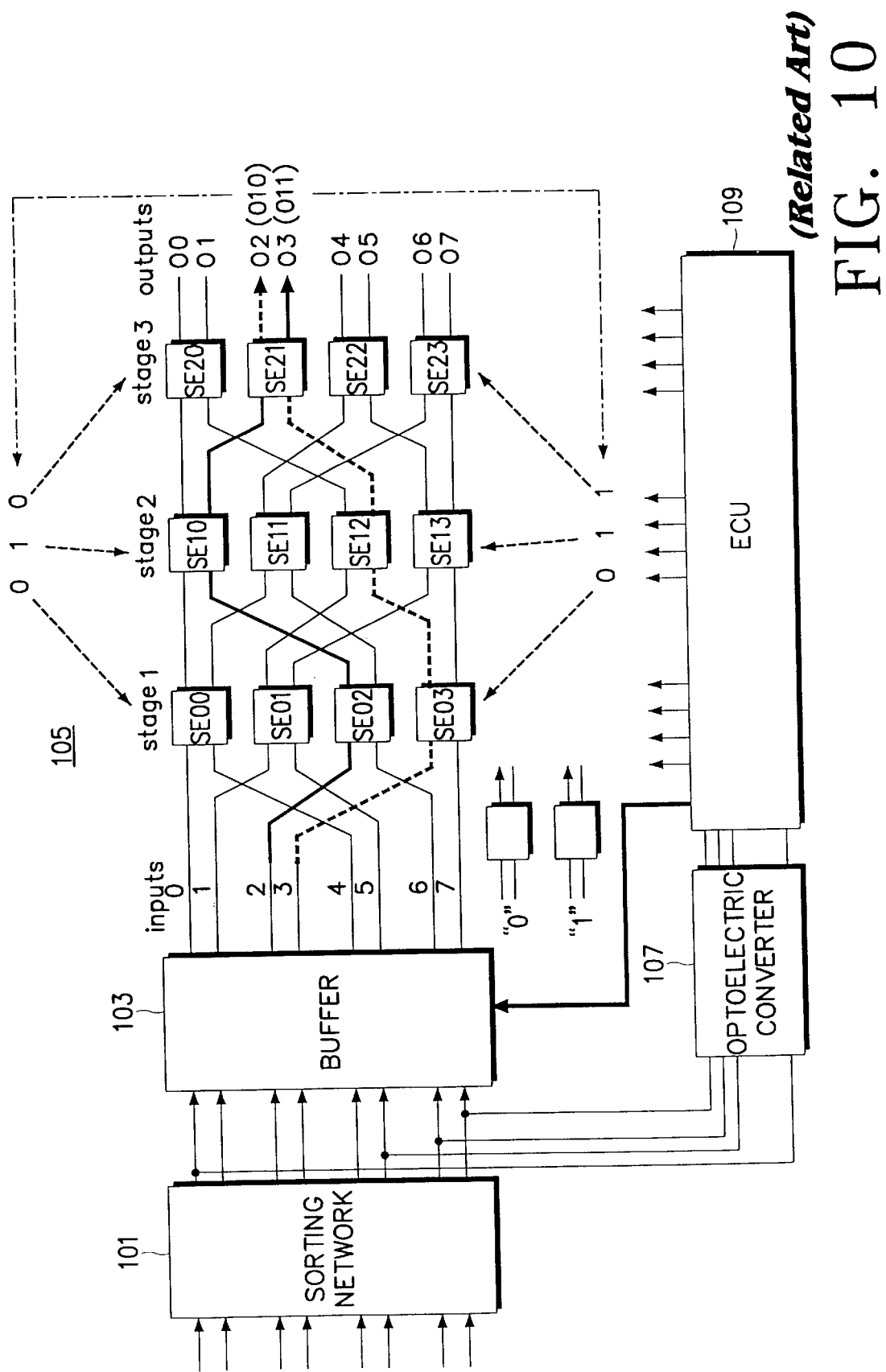
FIG. 10 schematically illustrates a multi-stage optical switching network equivalent to the single-stage Omega network shown in FIG. 4.

FIG. 10 schematically illustrates a multi-stage optical switching network equivalent to the single-stage Omega network of FIG. 4, in terms of operation. In FIG. 10, it is assumed that cell address bits are "010" and "011". In these cases, an input cell for the address bits "010" is output to the output coupler ODC2, and an input cell for the address bits "011" is output to the output coupler ODC3. Output of a cell with the address bits "010" from the input coupler IDC3 to the output coupler ODC3 in the embodiment of the present invention shown in FIG. 4 will be described here.

In the beginning, the ECU 109 controls the input coupler IDC2 and the switch coupler SWDC1 to be set to exchange and bypass states, respectively. Then, the input coupler IDC3 exchanges a cell received via the input port ip3 and applies the exchanged cell to the second input port of the switch coupler SWDC1. The switch coupler SWDC1 bypasses the received cell and outputs the bypassed cell to the output coupler ODC3. The circulation counter n is set to 1.

Then, the ECU 109 controls the output coupler ODC3 to an exchange state in the first circulation stage. Thus, the cell received in the output coupler ODC3 is fed back to the recursive input port rip6 of the input coupler IDC6 via the recursive output port rop3, through an optical recursive loop. At this time, the ECU 109 generates the switch control signal SWPC for the switch coupler SWDC3 to output an input cell via the first output port, that is, the upper output port thereof since the first bit of the address bits is "0". Thus, the switch coupler SWDC3 bypasses the cell received from the input coupler IDC6, and outputs the bypassed cell to the output coupler ODC6. Then, the circulation counter n is incremented by one.

In the second circulation stage, the ECU 109 controls the output coupler ODC6 to be set to an exchange state. Thus, the cell received in the output coupler ODC6 is fed back to the recursive input port rip5 of the input coupler IDC5 via the recursive output port rop6, through the optical recursive loop. At this time, since the second bit of the address bits is "1", the ECU 109 generates the switch control signal SWPC for controlling the switch coupler SWDC2 to output an input cell via the second output port, that is, the lower output port thereof. Thus, the switch coupler SWDC2 bypasses the cell received from the input coupler IDC5 to the output coupler ODC5. Then, the circulation counter n is incremented again by one.

In the third circulation stage, the ECU 109 controls the output coupler ODC5 to be set to an exchange state. Thus, the cell received in the output coupler ODC5 is fed back to the recursive input port rip3 of the input coupler IDC3 via the recursive output port rop5, through the optical recursive loop. At this time, since the third bit of the address bits is "0", the ECU 109 generates the switch control signal SWPC for controlling the switch coupler SWDC1 to output an input cell via the first output port, that is, the upper output port thereof. Thus, the switch coupler SWDC1 bypasses the cell received from the input coupler IDC3 to the output coupler ODC2. Then, the circulation counter n is incremented by one.

After three circulations, the ECU 109 recognizes the termination of the circulation/switching operation, with reference to the value of the circulation counter n, and generates the output control signal OPC for controlling the output coupler ODC2 to be set to a bypass state. Then, the output coupler ODC2 bypasses the received cell to the output port op2.

Accordingly, such a circulation/switching operation is equivalent to that of the multi-stage optical switching network shown in FIG. 10. That is, after analyzing the headers of input cells, the ECU 109 determines paths for all the cells and the control states of switch elements for three circulations, according to the input and output port numbers of the cells and a routing table. This brings out the same effect as that of determining switch elements in the three stages as shown in FIG. 10. Then, the ECU 109 controls switching of the cells circulated three times, which is also the same as switching cells by controlling the three-stage switch elements in FIG. 10. Therefore, it is noted that the single-stage optical switching network performs the same function as that of the multi-stage optical switching network, by switching cells through circulations as many as the stages of the multi-stage optical switching network.

Figure 11:
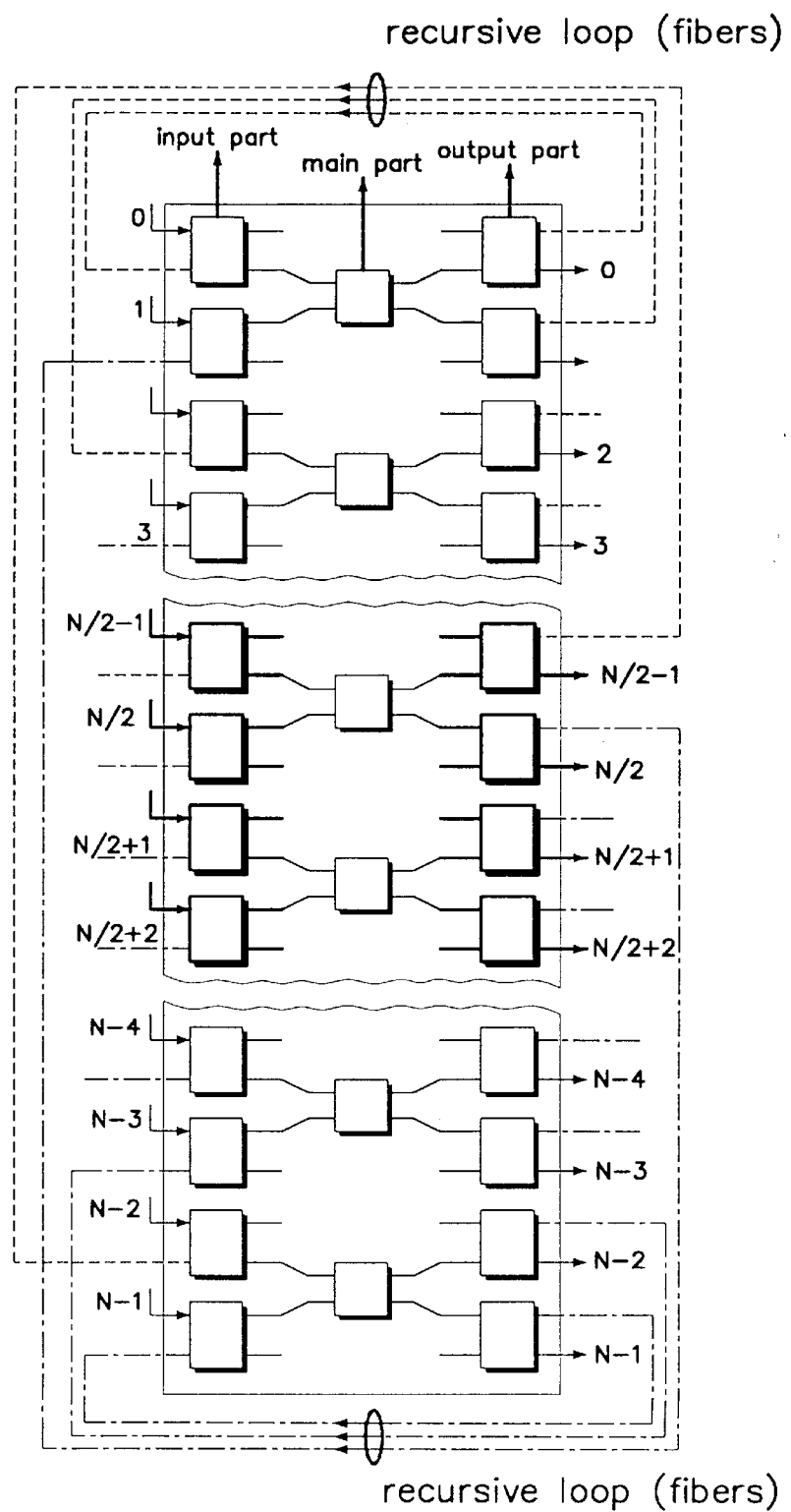
FIG. 11 schematically illustrates a single-stage N×N Omega network according to another embodiment of the present invention.
Figure 12:
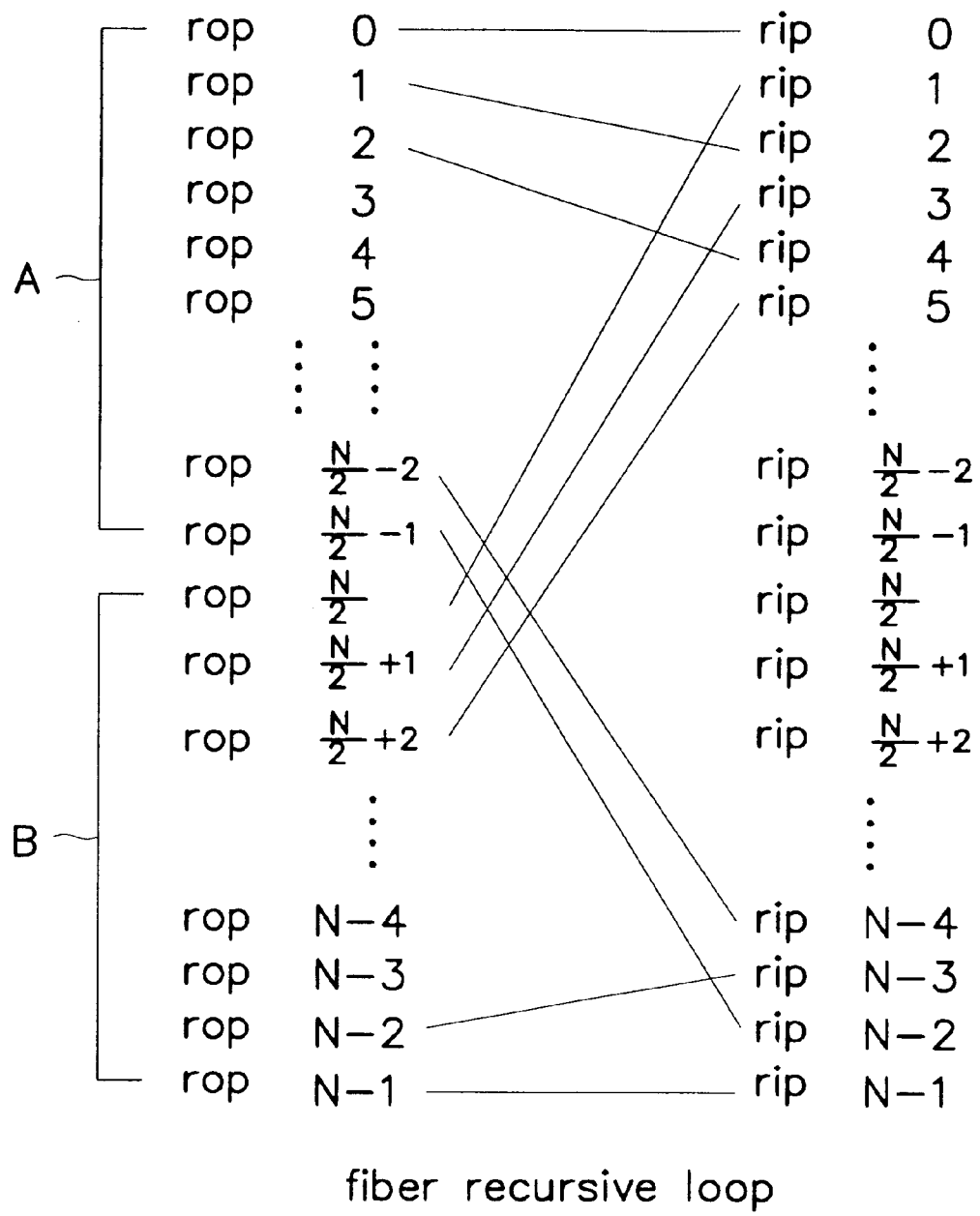
FIG. 12 illustrates a shuffle scheme of the single-stage N×N Omega network shown in FIG. 11.

FIG. 11 schematically illustrates a single-stage Omega network with N inputs and N outputs according to another embodiment of the present invention. FIG. 12 illustrates interconnection between recursive output ports rop0–rop(N−1) of the output part 30 and recursive input ports rip0–rip(N−1) of the input part 10, for a perfect-shuffle recursive loop in the Omega network of FIG. 11. Here, such interconnection is determined by equation (1).

The above shuffle/switch network is based on an interconnection pattern called perfect shuffle. In the perfect-shuffle interconnection of N(=$2^n$)nodes, denoted by σ, each node is connected to a node whose address is obtained by cyclically shifting its previous address to the left by one bit. This can be expressed as $$\sigma(x)=2x \ 0 \leq x < N/2$$
$$\sigma(x)=2x-N+1 \ N/2 \leq x < N \quad (1)$$

From equation (1), an x-numbered recursive output port is connected to a 2x-numbered recursive input port, if 0≦x<N/2, for a shuffle loop in the Omega network according to the embodiment of the present invention. That is, the recursive output port rop0 is connected to the recursive input port rip0, the recursive output port rop1 to the recursive input port rip2, the recursive output port rop3 to the recursive input port rip6, the recursive output port rop4 to the recursive input port rip8, the recursive output port rop((N/2)−2) to the recursive input port rip(N−4), and the recursive output port rop((N/2)−1) to the recursive input port rip(N−2). On the other hand, if N/2≦x<N, the x-numbered recursive output port is connected to a (2x−N−1) recursive input port. That is, the recursive output port rop(N/2) is connected to the recursive input port rip1, the recursive output port rop((N/2)+1) to the recursive input port rip3, the recursive output port rop((N/2)+2) to the recur input port rip5, the recursive output port rop(N−4) to the recursive input port rip(N−7), the recursive output port rop(N−3) to the recursive input port rip(N−5), the recursive output port rop(N−2) to the recursive input port rip(N−3), and the recursive output port rop(N−1) to the recursive input port rip(N−1). FIG. 12 illustrates a recursive loop formed by connecting the recursive output ports rop0–rop(N−1) to their corresponding recursive input ports rip0–rip(N−1) in the single-stage Omega network.

Such a single-stage shuffle/switch network is obtained by perfect shuffle permutation, followed by a stage of 2×2 switch elements for exchanging data between pairs of ports which differ in the least significant bits (LSBs) of their addresses.

Figure 13A:
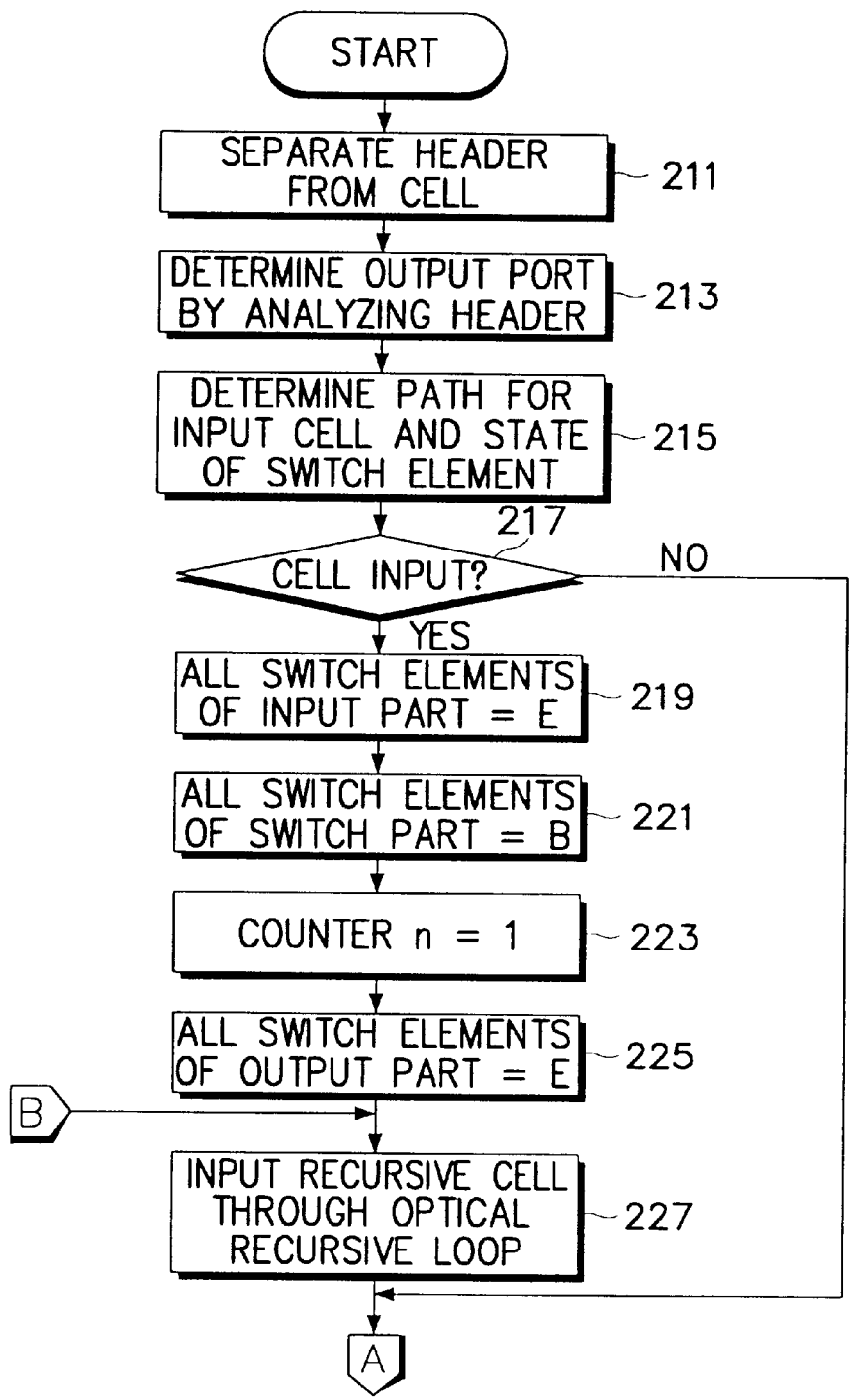
FIGS. 13A–13B together form a flowchart of switching cells in the single-stage N×N Omega network shown in FIG. 11.
Figure 13B:
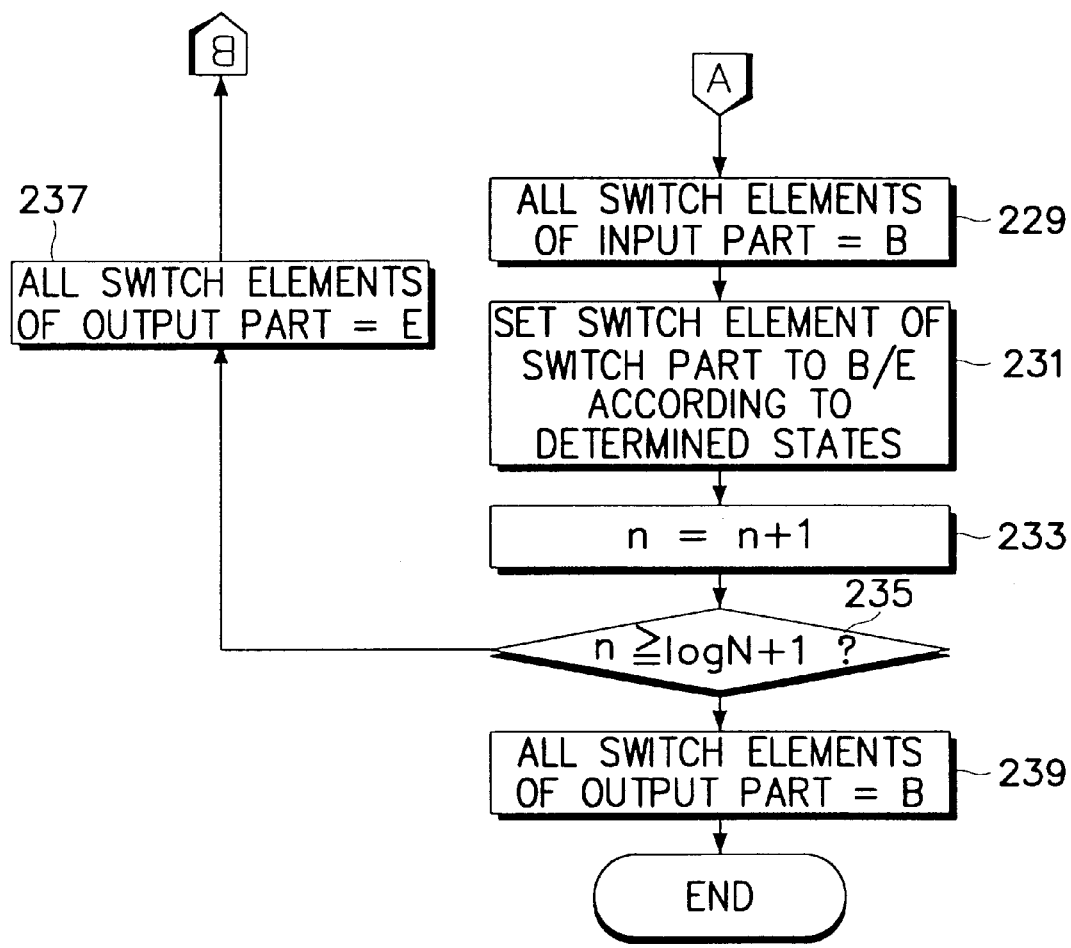

Input cells are recursively switched, as shown in FIGS. 13A–13B, during circulations in the single-stage Omega network constituted as in FIGS. 11 and 12.

Referring to FIGS. 13A–13B, upon input of cells from the optoelectric converter 107, the ECU 109 separates headers from the received cells in step 211, and determines output ports for the cells by analyzing the headers in step 213. In step 215, the ECU 109 simultaneously determines paths for the cells and the states of the switch elements depending on the number of circulations, according to the input and output port numbers of the cells and a routing table. Then, the ECU 109 controls the buffer 103 to send its stored cells to their corresponding input ports ip0–ip(N−1) of the input part 10.

The ECU 109 recognizes the input of the cells to the corresponding input ports ip0–ip(N−1) of the input part 10, in step 217, and generates the input control signal IPC for controlling the input part 10 to select the input ports ip0–ip(N−1), as shown in FIG. 6A, in step 219. In step 221, the ECU 109 generates the switch control signal SWPC for controlling the switch elements of the switch part 20 to bypass input cells. Thus, the input part 10 exchanges the signals applied to their corresponding input ports ip–ip(N−1), as shown in FIG. 6A, and outputs the exchanged signals to corresponding switch elements of the switch part 20. The switch part 20 bypass the received cells as shown in FIG. 7B.

In step 223, the ECU 109 sets the circulation counter n indicating the number of circulations to 1. In steps 225–229, the ECU 109 generates the output control signal OPC for controlling the output part 30 to output input cells via the recursive output ports rop0–rop(N−1), and the input control signal IPC for controlling the input part 10 to bypass recursive cells, as shown in FIG. 6B. Thus, the output part 30 outputs the cells received from their corresponding switch elements via the recursive output ports rop0–rop(N−1), and the cells are fed back from the recursive output ports rop0–rop(N−1) to the input part 10 via their corresponding recursive input ports rip0–rip(N−1) through the recursive loop determined by equation (1).

In step 231, the ECU 109 controls the recursive cells to be exchanged or bypassed. That is, the ECU 109 generates the switch control signal SWPC for switching cells according to the current number of circulations along the cell paths determined in step 215. Thus, the switch elements of the switch part 20 exchange input cells, as shown in FIG. 7A, or bypass the input cells, as shown in FIG. 7B, by means of the switch control signal SWPC.

In step 233, the ECU 109 increments the circulation counter n by one, which implies that input cells are switched once. In step 233, the ECU 109 determines whether the value of the circulation counter n is $\log_2(N+1)$, indicating completion of N cell switchings in the N×N switching network shown in FIG. 11. If the value of the circulation counter n is smaller than $\log_2(N+1)$, the switching operation is yet to be performed. Therefore, the ECU 109 generates the output control signal OPC for keeping the output part 30 in the state shown in FIG. 8A, in step 237. Then, the procedure goes back to step 227.

As described above, the ECU 109 controls input cells to be switched by sequentially analyzing the address bits of the cell headers, so that the output part 30 and the input part 10 recursively outputs and receives switched cells, respectively. If cells are repeatedly switched during circulations until the circulation counter n is $\log_2(N+1)$, this implies that the switching operation is completed with respect to the N-bit address bits of the cell headers. In this case, the ECU 109 generates the output control signal OPC for controlling output couplers ODC0–ODC(N−1) of the output part 30 to output completely switched cells via the output ports op0–op(N−1), in step 239. Thus, the output couplers ODC0–ODC(N−1) of the output part 30 finally output the switched cells, as shown in FIG. 8B.

As described above, in the single-stage Omega network, the recursive output ports rop0–rop(N−1) of the output couplers ODC0–ODC(N−1) are connected to their corresponding recursive input ports rip0–rip(N−1) of input couplers IDC0–IDC(N−1), for perfect shuffle, and input cells are switched through N circulations. Here, since a general N×N switching network has N stages, the number of circulations is set to N in the single-stage Omega network in order to perform the same switching operation as that of the N-stage switching network.

Cells are recursively switched $\log_2$ N-times. Here, $\log_2$ N is at once the number of address bits included in a cell header for cell switching and the number of general switch stages.

Therefore, with N of 16, cells are circulated four times, with N of 32, the cells are circulated five times, and with N of 64, the cells are circulated six times.

The single-stage Omega network constituted as above can be used for other MINs such as a sorting network, a copy network, and a distribution network. Further, though directional couplers are used as the 2×2 switch elements in the embodiments of the present invention, general 2×2 switch elements may also be used.

The single-stage optical switching network with a recirculating structure according to the embodiments of the present invention has the following advantages:

(1) Use of the single-stage optical switching network with a recirculating structure can reduce hardware remarkably, especially in a large switching network (N of 32, 64, 128, ... ). To implement an N×N self-routing non-blocking switching device, a general switching network needs (N/2)×$\log_2$ N switch elements, whereas the switching network of the present invention requires 2.5 N switch elements. Assuming that the numbers of the switch elements that the general switching network and the switching network of the present invention need are X1 and X2, respectively, X1=192 and X2=160, if N is 64. With N of 128, X1=448, while X2=320. With N of 256, X1=1024, while X2=640. With N of 1024, X1=5120, while X2=2560.

In addition, in consideration of other networks such as a distribution network, a copy network, and a sort network, as well as the self-routing non-blocking network, the single-stage optical switching network according to the embodiments of the present invention can reduce more switch elements.

(2) The optical switching network according to the embodiments of the present invention can minimize devices. That is, it can be made compact by replacing switches connected in a plurality of stages with a single chip.

(3) The optical switching network according to the embodiments of the present invention costs less for integration. That is, it can be easily integrated in an optical switching device, using waveguides and optical fiber technologies widely used for a long time.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A single-stage optical switching network comprising:
N input couplers each having a cell input port and a recursive input port, N being a positive even integer;
N output couplers each having a cell output port and a recursive output port;
N/2 switch couplers connected between the input couplers and the output couplers; and
a controller having a routing table, for generating control signals for the respective input, output, and switch couplers upon input of cells,
an optical recursive loop being formed by connecting an x-numbered recursive output port to a 2x-numbered recursive input port upon $0 \leq x < N/2$, and by connecting the x-numbered recursive output port to a (2x−N+1)-numbered recursive input port upon $N/2 \leq x < N$, the N input couplers receiving the cells via the cell input ports upon input of the cells, the N/2 switch couplers recursively switching the cells $\log_2$ N-times by connecting the recursive output ports to the corresponding recursive input ports during circulations, and the N output couplers outputting the cells via the cell output ports at the termination of switching, x being a positive integer.

2. A single-stage optical switching network comprising:
an input part having N input couplers, each of which has a cell input port, a recursive input port, and an output port, for selecting the cell input port in the beginning and selecting the recursive input port during a circulation, by means of an input control signal, N being a positive even integer;
an output part having N output couplers, each of which has an input port, a cell output port, and a recursive output port, for selecting the recursive output port during the circulation and selecting the cell output port at the end, by means of an output control signal;
a switch part having N/2 switch couplers, each of which has two input ports connected to two corresponding input couplers and two output ports connected to two corresponding output couplers, for switching an optical signal received from a corresponding input coupler by means of a switch control signal; and
a controller for generating the input control signal for connecting the input couplers to the cell input ports upon input of cells, generating the output control signal and the input control signal for connecting the recursive output ports to the corresponding recursive input ports, and the switch control signal for controlling the switch couplers to recursively switch the cells $\log_2$ N-times during circulations, and for generating the output control signal for controlling the output couplers to output the cells via the cell output ports at the termination of switching.

3. An optical switching method for use in a single-stage optical switching network comprising N input couplers each having a cell input port and a recursive input port, N output couplers each having a cell output port and a recursive output port, N/2 switch couplers connected between the input couplers and the output couplers, and a controller having a routing table, for generating control signals for the respective input, output, and switch couplers upon input of cells, thereby forming an optical recursive loop by connecting an x-numbered recursive output port to a 2x-numbered recursive input port if $0 \leq x < N/2$, and connecting the x-numbered recursive output port to a (2x−N+1)-numbered recursive input port if $N/2 \leq x < N$, N being a positive even integer and x being a positive integer the optical switching method comprising the steps of:
receiving the cells in the N input couplers via the cell input ports upon input of the cells;
recursively switching the cells $\log_2$ N-times in the N/2 switch couplers by connecting the recursive output ports to the corresponding recursive input ports during circulations; and
outputting the cells from the N output couplers via the cell output ports at the termination of switching.

4. An optical switching method for use in a single-stage optical switching network comprising an input part having N input couplers, each of which has a cell input port and a recursive input port, an output part having N output couplers, each of which has a cell output port and a recursive output port, and a switch part connected between the input part and the output part, the recursive output ports being connected to the recursive input ports by optical fibers, for perfect shuffle, N being a positive integer the optical switching method comprising the steps of:

receiving cells in the input couplers via the cell input ports upon input of the cells;

forming a recursive loop by connecting the recursive output ports to corresponding recursive input ports, and recursively switching the cells $\log_2$ N-times in the switch part by analyzing address bits of the input cells, during circulations; and outputting completely switched cells from the output couplers via the cell output ports at the termination of switching.

* * * * *